United States Patent [19]
Wilson

[11] Patent Number: 6,086,807
[45] Date of Patent: Jul. 11, 2000

[54] MOLD FOR CAST PIECE

[76] Inventor: Michael Thomas Wilson, 3131 Villa La., Missouri City, Tex. 77459

[21] Appl. No.: 09/072,303

[22] Filed: May 4, 1998

[51] Int. Cl.⁷ .............................. B29C 33/40; B29C 39/26
[52] U.S. Cl. .......................... 264/225; 249/102; 249/108; 425/2; 425/175; 425/DIG. 44; 264/313
[58] Field of Search ................................ 425/2, 175, 183, 425/DIG. 44; 264/222, 223, 227, DIG. 30, 313, 225; 249/102, 108

[56] References Cited

U.S. PATENT DOCUMENTS

| | | | |
|---|---|---|---|
| 802,696 | 10/1905 | Jackson et al. | 249/108 |
| 1,149,842 | 8/1915 | May et al. | 249/108 |
| 1,842,016 | 1/1932 | Foley | 249/108 |
| 2,044,359 | 7/1936 | Kuettel | 425/175 |
| 3,989,220 | 11/1976 | Greenberg | 249/105 |
| 4,335,067 | 6/1982 | Castanis et al. | 264/222 |
| 4,735,754 | 4/1988 | Buckner | 264/223 |
| 4,828,116 | 5/1989 | Garcia | 206/575 |
| 4,941,212 | 7/1990 | Liff | 264/222 |
| 4,946,286 | 8/1990 | Purkapile | 366/247 |
| 5,364,580 | 11/1994 | Prent | 264/138 |
| 5,645,347 | 7/1997 | Draenert | 366/242 |
| 5,660,342 | 8/1997 | Bock | 241/100 |
| 5,695,282 | 12/1997 | Hess | 366/256 |
| 5,709,467 | 1/1998 | Galliano, II | 366/130 |

FOREIGN PATENT DOCUMENTS

| | | | |
|---|---|---|---|
| 1078-614 | 9/1984 | Japan | 249/105 |
| 1018-609 | 7/1987 | Japan | 425/2 |

Primary Examiner—Robert Davis
Assistant Examiner—Thukhanh T. Nguyen
Attorney, Agent, or Firm—Conley, Rose & Tayon, P.C.

[57] ABSTRACT

A molding apparatus for forming a molded piece that includes a positive impression of an object, the molded piece comprising a monolithic block that is larger than the object. The apparatus comprises a container in which a negative impression of the object is formed by casting it in a fast-setting flowable compound, and a mold extension that snaps on to the container and provides an additional mold volume that is contiguous with the negative impression. The invention further comprises a mixing apparatus for mixing fast-setting compounds. In one embodiment, the mixing apparatus comprises a cylindrical jar with a screw-on lid. A rod passes through an aperture in the lid and moves axially with respect to the jar. The end of the rod external to the jar is configured as a handle, and the end of the rod internal to the jar is connected to a circular mesh. The circular mesh is oriented parallel to the bottom of the jar and has an outer diameter which is slightly less than the smallest inner diameter of the jar. Mixing is accomplished by repeatedly moving the mesh axially from the lid to the bottom of the jar and back again. The mesh cross-members have a cross-section which acts to break up clumps as they form, and the holes passing through the mesh have a constriction which advantageously adds turbulence to the mixture, enhancing the mixing efficiency of the mesh.

17 Claims, 3 Drawing Sheets

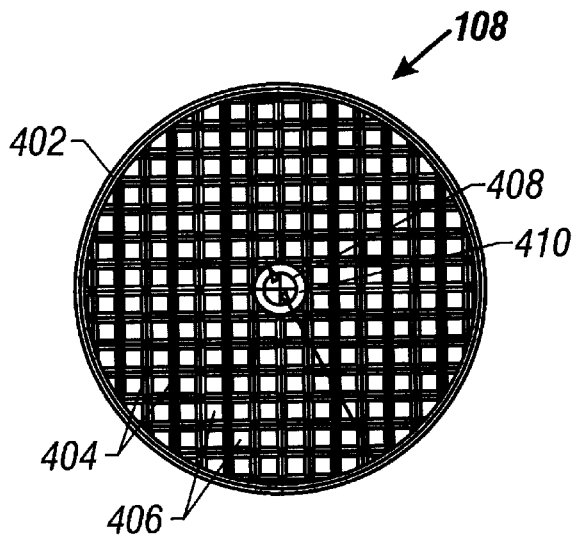
FIG. 4
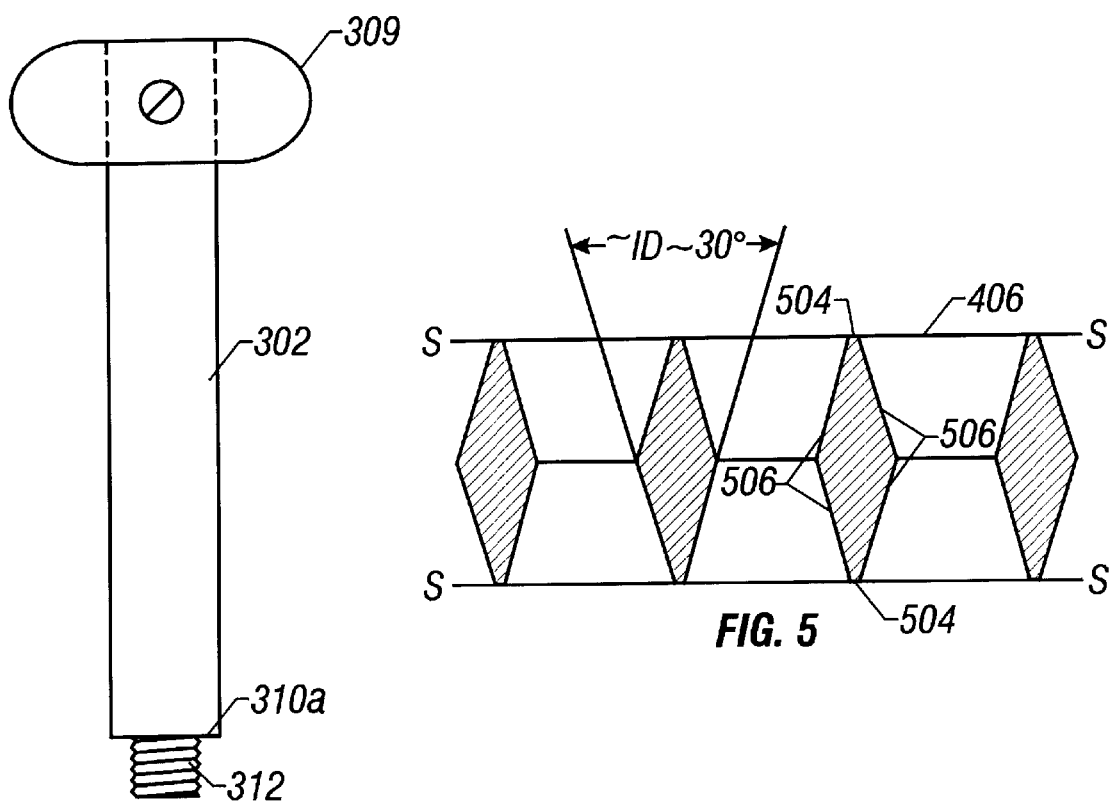
FIG. 5
FIG. 6

MOLD FOR CAST PIECE

BACKGROUND OF THE INVENTION

1. Field of the Invention

This invention relates to an apparatus for mixing a powder with a liquid, and in particular, to a mixing jar for quickly mixing components of a fast-setting, flowable molding compound.

2. Description of the Related Art

People create duplicates of objects for many reasons including art, prosthetics, and mass production. Often the first step is the creation of a "negative impression" of the object by pressing the object into a deformable molding compound that reshapes itself against the surface of the object and holds the new shape after the object is removed. Afterwards reproductions of the object may be produced by pouring a substance into the negative impression and allowing the substance to harden. The substance's shape is then that of the original object.

Alginates are used as a fast-setting flowable molding compound in dentistry. Irreversible hydrocolloids, more commonly called alginates, were developed during World War II. Alginates are salts of alginic acid, a hydrophylic colloidal polysaccharide. Alginic acid, in the form of mixed salts with sodium, calcium, magnesium, and other bases, makes up a large portion of the cell walls of marine kelp, and is a by-product in the preparation of iodine from kelp. Alginates are changed from soluble form to insoluble gel form by an irreversible chemical reaction.

The essential constituents of alginate impression powders are the soluble alginate, a reactor such as calcium sulfate, and a retarder such as trisodium phosphate. When this powder is mixed with water, all three ingredients proceed to dissolve. The retarder, however, ties up the reactor for a short time so that the reactor is not available to convert the soluble alginate to an insoluble gel. After the retarder is spent, gelation begins throughout the powder-water mixture. Among the patents disclosing alginate impression compounds are U.S. Pat. No. 3,010,834 (Crowell) and U.S. Pat. No. 2,249,694 (Wilding). The setting times of commercially-available alginate impression materials range from about 1 minute to about 4 minutes.

The powder-water mixture preferably achieves a uniform pasty gel-like flowable consistency. It cannot be too soupy, nor too dry, and powdery "pockets" in the mix are unsatisfactory. The mixture must be provided in the correct proportions and then mixed thoroughly to ensure that the water is evenly distributed. During mixing, clumps containing dry or partially dry powder tend to form in the mix. These clumps resist the introduction of water and must be broken to allow the water to reach the powder they contain. One way of accomplishing the mixing is in a bowl with a spatula. This method tends to be messy and to require a certain level of skill. The mixing must be gentle enough to avoid scattering powder and yet vigorous enough to ensure thorough distribution of the water to all the powder. A somewhat costly alternative is to buy a machine to do the mixing.

The mixing problems are exacerbated as the required amount of molding compound increases. The greater the amounts of powder and water, the greater the tendency of clumps to form. Increased agitation time is not a feasible alternative due to the fast setting times of the alginate compounds. Mixing small batches and adding the molding compound to the mold one batch at a time leads to seam lines in the mold and may even lead to separation of the mold along the interfaces between batches. An inexpensive apparatus for quickly mixing components of a fast-setting, flowable molding compound is therefore desirable.

In addition, it is sometimes desired to create a molded object by filling the mold formed by the fast-setting molding compound with a second molding compound. The second molding compound may form a more permanent material that sets into a rigid solid, such as a plaster. By filling the negative mold with the second molding compound, a positive impression of the original object is formed. Because the original object, and hence the negative impression molded therefrom, may be quite small, it is desirable to provide a means by which the second, positive molded impression can be extended so as to form a molded object that is better suited for display. It is further desired that the extension of the molded object be formed to produce a particular desirable appearance. In addition, in order to minimize handling of the negative mold, it is desirable to provide a system by which the positive impression can be formed without removing the negative mold from the container in which it is formed.

SUMMARY OF THE INVENTION

Accordingly, a mixing apparatus for fast-setting compounds is provided herein. In one embodiment, the mixing apparatus comprises a cylindrical jar with a screw-on lid. A rod passes through an aperture in the lid and moves axially with respect to the jar. The end of the rod external to the jar is configured as a handle, and the end of the rod internal to the jar is connected to a circular mesh. The circular mesh is oriented parallel to the bottom of the jar and has an outer diameter that is slightly less than the smallest inner diameter of the jar. Mixing is accomplished by repeatedly moving the mesh axially from the lid to the bottom of the jar and back again. The mesh cross-members have a cross-section that acts to break up clumps as they form, and the holes passing through the mesh have a constriction that advantageously adds turbulence to the mixture, enhancing the mixing efficiency of the mesh.

BRIEF DESCRIPTION OF THE DRAWINGS

Other objects and advantages of the invention will become apparent upon reading the following detailed description and upon reference to the accompanying drawings in which:

FIG. 4 shows an enlarged view of a mixing mesh;

FIG. 5 shows a cross-sectional view of a mixing mesh;

FIG. 6 shows an alternative embodiment of the present rod and mesh;

Figure 1:
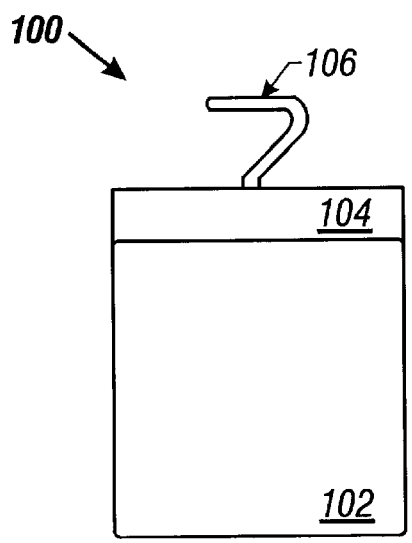
FIG. 1 shows a mixing apparatus for quickly mixing a fast setting flowable molding compound.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Mixing Mold Container

Turning now to the figures, FIG. 1 shows a mixing apparatus 100 for quickly mixing a fast setting flowable molding compound. Mixing apparatus 100 may be part of a kit for reproducing body parts. In addition to mixing apparatus 100, such a kit might also include a packet of alginate powder and instructions. The instructions would indicate that the water and the alginate powder are to be mixed in the mixing apparatus. Following removal of the mixing blade, the item whose impression is to be formed is positioned in the liquid molding compound contained in the mixing apparatus. This avoids the need to decant the fast-setting molding compound. The item to be reproduced (e.g. the hand) is inserted into the compound and held in place until the compound sets. After the compound has set, it has the consistency and flexibility of hard-boiled egg white, thus permitting the removal of the body part without harming the negative impression. A reproduction can then be formed by pouring another molding material (e.g. plaster) into the negative impression.

Figure 2:
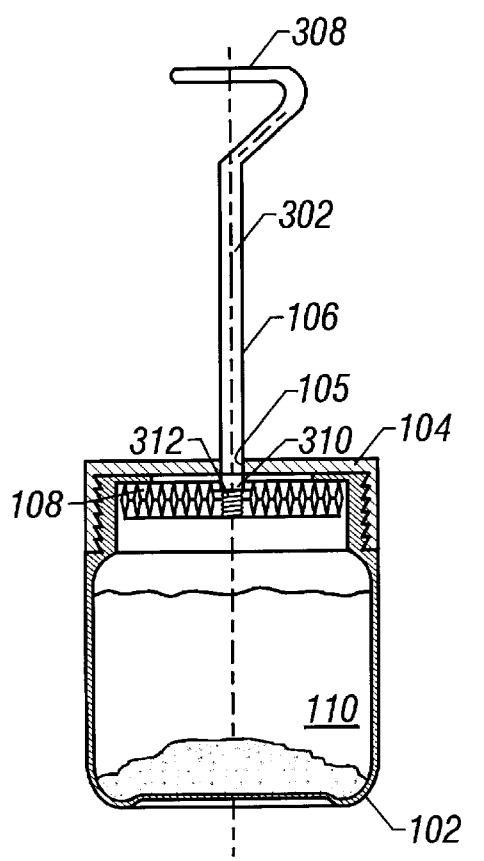
FIGS. 2 and 3 show a cross-sectional view of the mixing apparatus of FIG. 1, with the mixing blade of the present invention upper and lower extreme positions, respectively.
Figure 3:
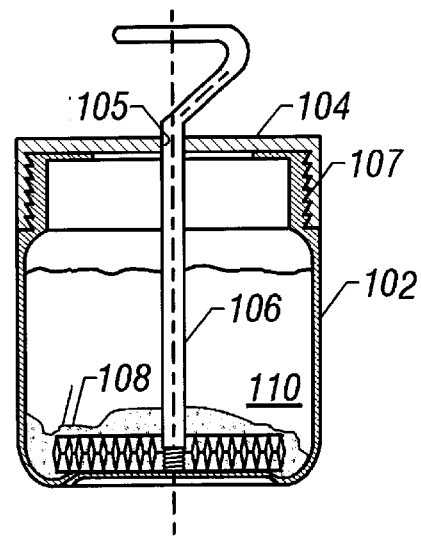

Referring now also to FIGS. 2 and 3, mixing apparatus 100 comprises a cylindrical container 102, a lid 104, a rod 106, and a mesh 108. Cylindrical container 102 is shown containing a partially blended mixture 110. Although cylindrical container 102 is shown as a uniform cylinder, jars and containers of other shapes may also be used. In one embodiment, cylindrical container 102 has threads 107 around the rim for engaging corresponding threads on lid 104.

Lid 104 preferably seals cylindrical container 102 tightly enough to prevent spillage of mixture 110, which preferably comprises water and an alginate powder. Lid 104 is provided with an aperture 105 that is just big enough for rod 106. Prior to placement of lid 104 on container 102, rod 106 is inserted through the aperture 105 and connected to mesh 108. The connection of rod 106 is preferably by means of mating threads. Mesh 108 preferably includes a central, axial, internally threaded aperture such that when mesh 108 is threaded onto the end of rod 105, mesh 108 is generally normal to rod 105 and therefore also normal to the longitudinal axis of cylindrical container 102.

FIGS. 2 and 3 show a cross-sectional view of mixing apparatus 100 with mesh 108 in its upper and lower extreme positions, respectively. By manipulating rod 106, a user can move the mesh from the top of container 102 to the bottom of container 102 through mixture 110 and back again, thereby mixing mixture 110 until the mixture achieves a desired consistency. It is noted that although container 102 is not shown having a flat bottom, a container 102 with a flat bottom is generally preferred to prevent unmixed powder from accumulating in depressions on the bottom.

FIG. 2 shows one embodiment of rod 106. In this embodiment, rod 106 comprises a shaft 302, a handle 308, a threaded portion 312, and a stabilizing flange 310. The rod 106 screws into mesh 108 by means of threads 312 until stabilizing flange 310 abuts against mesh 108. This configuration acts to keep mesh 108 rigidly connected to rod 106 and oriented perpendicularly to the axis of container 102. It is further preferred that the diameter of rod 106 be uniform above the stabilizing flange 310, and that the upper portion of rod 106 be configured to form handle 308 by bending rod 106 as at 304 and 306. During assembly of mixer apparatus 100, this configuration allows the handle end of rod 106 to be inserted through the aperture 105 in lid 104, while allowing flange 310 to be significantly larger in diameter than opening 105. Rod 106 is inserted from the underside or inside of lid 104. The diameter of rod 106 is preferably uniform along the length of the rod, so as to ensure a consistent seal between rod 106 and lid 104.

According to the alternative embodiment shown in FIG. 6, shaft 302 of rod 106 has a diameter larger than that of the threaded portion 312, thereby forming a shoulder 310a that functions in the same manner as flange 310 to stabilize mesh 108. In this embodiment, since rod 106 is inserted through opening 105 in lid 104 from the outside, rod 106 can be provided with a knob 309 or similar hand-piece affixed to its upper end. In this alternative embodiment, rod 106 is substantially straight. These alternative configurations each allow for easy manipulation of rod 106 and easy disassembly of mixer apparatus 100, while permitting the aperture to be a snug fit so as to minimize leakage during mixing.

FIG. 4 shows one preferred embodiment of mesh 108. According to this embodiment, mesh 108 comprises a rim 402, cross-members 404, and a central bore 408 surrounded by landing 410. Cross-members 404 span the space defined by rim 402 to form a grid of rectangular holes 406. Central bore 408 is internally threaded so as to engage threads 312. Landing 410 abuts stabilizing flange 310. Together, the engagement of threads 312 in bore 408 and the abutment of flange 310 on landing 410 act to keep the mesh rigidly connected to rod 106. In one embodiment, central bore 408 is self-threading, so that when screw thread 312 is screwed into hole 408, the mesh 108 deforms to correspond to screw thread 312.

The geometry of the holes 406 defined by cross-members 404 is illustrated in FIG. 5, which shows a partial cross-sectional view of mesh 108. The cross-sectional shape of each cross-member 404 is preferably that of a truncated diamond, with two facing surfaces 504 and four inclined surfaces 506. Facing surfaces 504 are so narrow that the cross-section is nearly rhombic. Inclined surfaces 506 converge at a fairly sharp angle, preferably between about 10 and 30 degrees, so as to provide a cutting action on any clumps of alginate that are encountered by mesh 108. The shape of cross-members 404 also provides holes 406 with a constriction midway through, which creates turbulence and enhance mixing efficiency.

It is noted that although the mixing action of mesh 108 is primarily accomplished by motion in the axial direction of container 102, the mesh 108 is not necessarily restricted from rotational motion. Accordingly, mesh 108 may be rotated against the bottom or top of the container 102 to knock loose any powder clumped against these surfaces, and/or rotated during the course of an axial stroke in either direction. Furthermore, on or more fins or blades can be provided on mesh 108 to scrape the walls of the container 102 clean when mesh 108 is rotated.

Mold Extension

Figure 7:
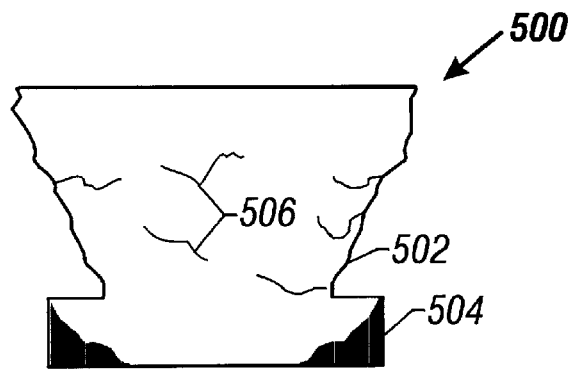
FIG. 7 shows a mold for use in conjunction with the mixing apparatus of FIG. 1.
Figure 8:
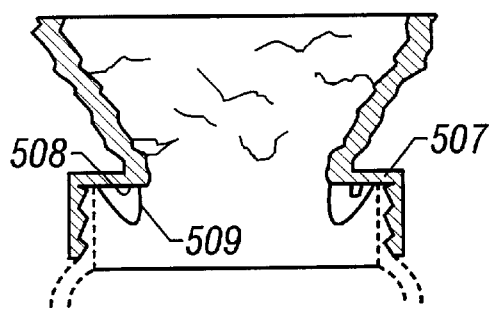
FIG. 8 is a cross-sectional view of the mold of FIG. 7.
Figure 9:
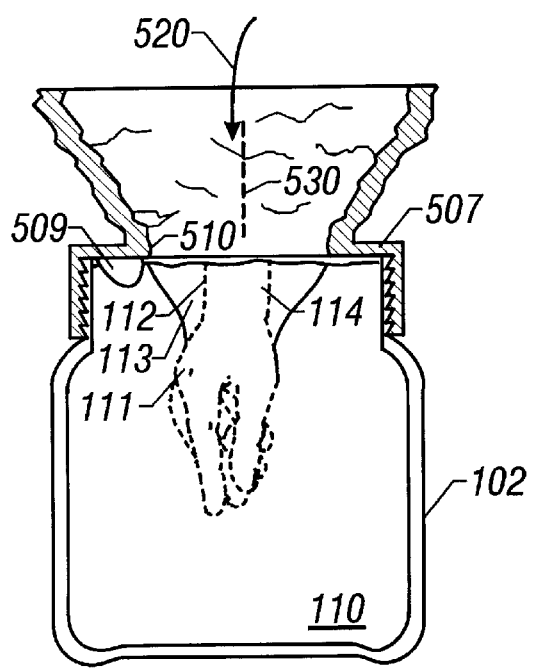
FIG. 9 is a cross-sectional view of the mold of FIG. 7 mounted on a mixing apparatus containing a molded material that defines a negative impression.

Referring now to FIGS. 7–9, a mold extension 500 that is suitable for use with container 102 comprises a substantially conical upper molding portion 502 and a lip 504 extending therefrom. Mold extension 500 is preferably made of a resilient, flexible material, such as silicone. Lip 504 is configured to snap over threads 107 on container 102 so as to form a seal therewith. Molding portion 502 preferably includes various desired mold features, such as irregularities 506. The irregularities 506 shown in the Figures are intended to produce a positive molded object resembling a rough stony surface, however, it will be apparent to those skilled in the art that any desired mold features can replace irregularities 506, including other surfaces, recognizable shapes, letters or numbers, etc. As best shown in FIG. 8, a web 507 connects molding portion 502 and lip 504. A plurality of fins or blades 509 extend substantially perpendicularly from the lower surface 508 of web 507.

Referring particularly now to FIG. 9, mold extension 500 is shown snapped onto mold container 102, which is shown containing a negative impression 111 of a hand (shown in phantom) formed from a fast-setting molding compound 110. When the negative impression 111 is originally cast, its opening 114 is defined by the inner surface of the impression adjacent to the upper surface of material 110, as at 112. It is preferred that a volume 113 of material 110 be removed from the circumference of opening 114 so that the transition between the inner surface of negative impression 111 and the inner surface 510 of mold extension 500 is less marked. It can be seen that blades 509 penetrate the upper surface of molding material 110. The penetration of material 110 by blades 509 serves to prevent the body of material 110, including impression 111 from rotating or shifting relative to mold extension 500 during molding.

Once mold extension 500 has engaged the container 102 and material 110 in this manner a total mold volume comprising negative impression 111 and the volume of molding portion 502 is formed. This total mold volume can then be filled in a conventional manner (as shown by arrow 520) with a second hard setting molding compound such as are well-known in the art. When the second molding compound has set up, mold extension 500, container 102 and material 110 are removed from the positive impression. In the embodiment shown, the positive impression is that of a hand extending out of a conical block having a stony outer surface. The extension formed in the foregoing manner allows an artful display of a molded piece that includes positive impression of a small object, such as in infant's hand, in which the molded piece comprises a monolithic block that is larger than the original object.

The embodiment shown in FIGS. 7–9 has a central axis 530 that is substantially vertical when mold extension 500 is mounted on container 102. It will be understood that mold extension 500 could be formed in various other configurations, in which the central axis of the extension is canted with respect to lip 504 and web 507. These versions would be used to align axis 530 with the axis of the negative impression 111, in the event that the original object (the hand, in the Figures) is not positioned substantially vertically during the first casting process.

Numerous variations and modifications will become apparent to those skilled in the art once the above disclosure is fully appreciated. It is intended that the following claims be interpreted to embrace all such variations and modifications.

What is claimed is:

1. A system for forming a molded piece that includes a positive impression of an object, the molded piece comprising a monolithic block that is larger than the object, comprising:

a container having an opening;

a fast-setting flowable compound in said container, said compound capable of forming a negative impression of the object;

a mold extension defining a mold volume that is contiguous with said negative impression, said mold extension being engageable with said container, wherein said mold extension comprises a resilient material.

2. The system according to claim 1 wherein said mold extension includes mold features formed so as to provide the molded piece with desired corresponding surface features.

3. The system according to claim 1 wherein said fast-setting compound comprises alginate.

4. A system for forming a molded piece that includes a positive impression of an object, the molded piece comprising a monolithic block that is larger than the object, comprising:

a container having an opening;

a fast-setting flowable compound in said container, said compound capable of forming a negative impression of the object;

a mold extension defining a mold volume that is contiguous with said negative impression, said mold extension being engageable with said container, wherein said mold extension includes blades for preventing relative rotation of said negative impression when said mold extension engages said container opening.

5. The system according to claim 4 wherein said mold extension comprises a first section that defines said mold volume and a second section that engages said container opening.

6. The system according to claim 5 wherein said second section comprises a web and a lip.

7. The system according to claim 6 wherein said web includes upper and lower surfaces and said blades extend from said lower web surface.

8. The system according to claim 4 wherein said container has a longitudinal axis and said mold extension has a central axis that forms an oblique angle with said axis of said container when said mold extension is mounted on said container.

9. A system for forming a molded piece that includes a positive impression of an object, the molded piece comprising a monolithic block that is larger than the object, comprising:

a container having an opening;

a fast-setting flowable compound in said container, said compound capable of forming a negative impression of the object;

a resilient mold extension defining a mold volume that is contiguous with said negative impression, said mold extension comprising a first section that defines said mold volume and a second section that engages said container opening, said mold extension including blades for preventing rotation of said negative impression relative to said mold extension when said mold extension engages said container opening.

10. The system according to claim 9, wherein said container has a longitudinal axis and said mold extension has a central axis that is not aligned with said axis of said container when said mold extension is mounted on said container.

11. A method for forming a molded piece that includes a positive impression of an object, the molded piece comprising a monolithic block that is larger than the object, comprising the steps of:

(a) providing a container having an opening;

(b) filling the container with an amount of a fast-setting flowable molding compound;

(c) placing the object in the flowable compound;

(d) allowing the compound to set up around the object;

(e) removing the object from the molding compound so as to leave a negative impression of the object in the material;

(f) affixing a mold extension to the container such that the mold extension defines a mold volume that is contiguous with the negative impression;

(g) filling the negative impression and the mold extension with a casting compound that sets up to form a molded piece that includes a positive impression of the object; and (h) removing the molded piece from the molding compound and the mold extension.

12. The method according to claim 11 wherein the mold extension comprises silicone.

13. The method according to claim 11 wherein said fast-setting compound comprises alginate.

14. The method according to claim 11, further including the step of substantially aligning a central axis of the mold extension with the negative impression in a desired manner.

15. The method according to claim 11, further including the step of positioning the longitudinal axis of the mold extension to be non-parallel to the axis of the container.

16. The system according to claim 1 wherein said container has a longitudinal axis and said mold extension has a central axis that is not parallel to said container longitudinal axis when said mold extension is mounted on said container.

17. The system according to claim 4 wherein said mold extension includes mold features formed so as to provide the molded piece with desired corresponding surface features.

* * * * *